United States Patent [19]

Zeller

[11] 4,145,836

[45] Mar. 27, 1979

[54] FLYING INSECT TRAP DEVICE FOR CONCEALING TRAPPED INSECTS

[75] Inventor: George B. Zeller, Lanoka Harbor, N.J.

[73] Assignee: American Home Products Corporation, New York, N.Y.

[21] Appl. No.: 828,404

[22] Filed: Aug. 29, 1977

[51] Int. Cl.² ............................................. A01M 1/14
[52] U.S. Cl. .................................................... 43/115
[58] Field of Search .......................... 43/114, 115, 136

[56] References Cited

U.S. PATENT DOCUMENTS

| | | | |
|---|---|---|---|
| 1,015,643 | 1/1912 | Serafinski | 43/114 |
| 1,597,287 | 8/1926 | Pinkerton | 43/115 |
| 3,708,908 | 1/1973 | Levey | 43/114 |

*Primary Examiner*—Nicholas P. Godici
*Assistant Examiner*—James G. Smith
*Attorney, Agent, or Firm*—Joseph Martin Weigman

[57] ABSTRACT

An insecticidal device of the "flypaper" type which utilizes a non-drying glue is disclosed which has the improved characteristics of concealing from sight the insects which are trapped on the glue. This is done by a plurality of opaque hoppers which are placed one above the other around a vertical support structure. The opening of each hopper is large at the top, providing access of the flying insects to the glue, and small at the bottom, to retain the insects which in time dry and fall free from the glue. An embodiment is disclosed in which provision is made to collect all of the dead insects in the bottom hopper.

6 Claims, 6 Drawing Figures

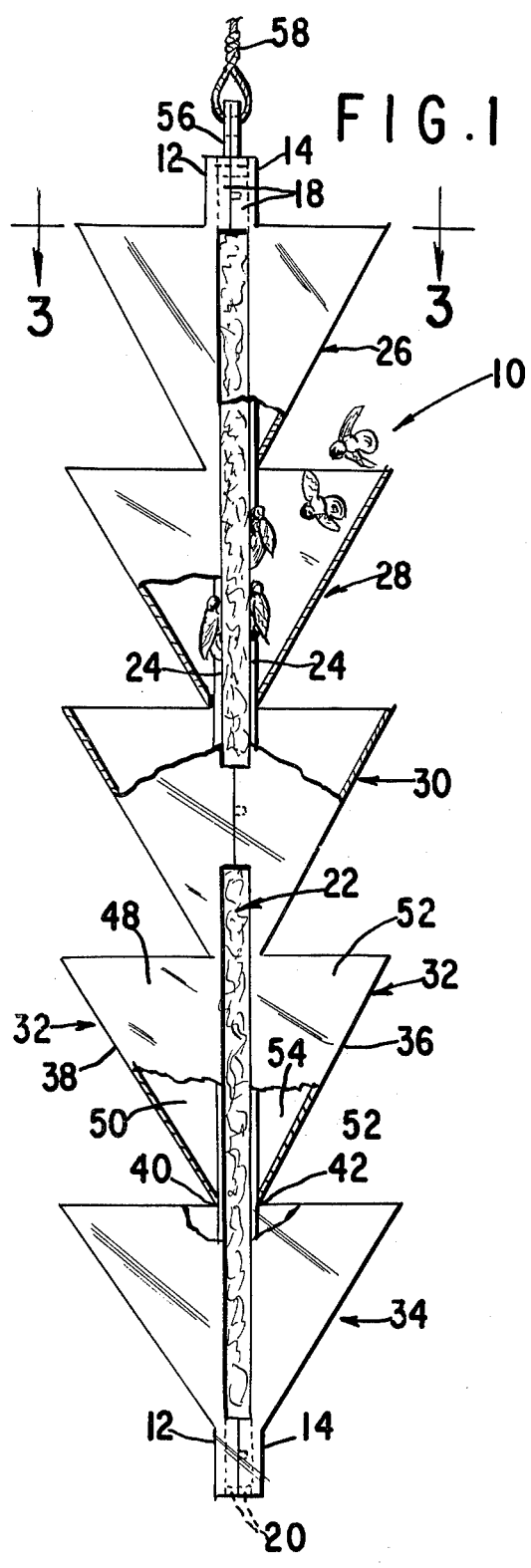
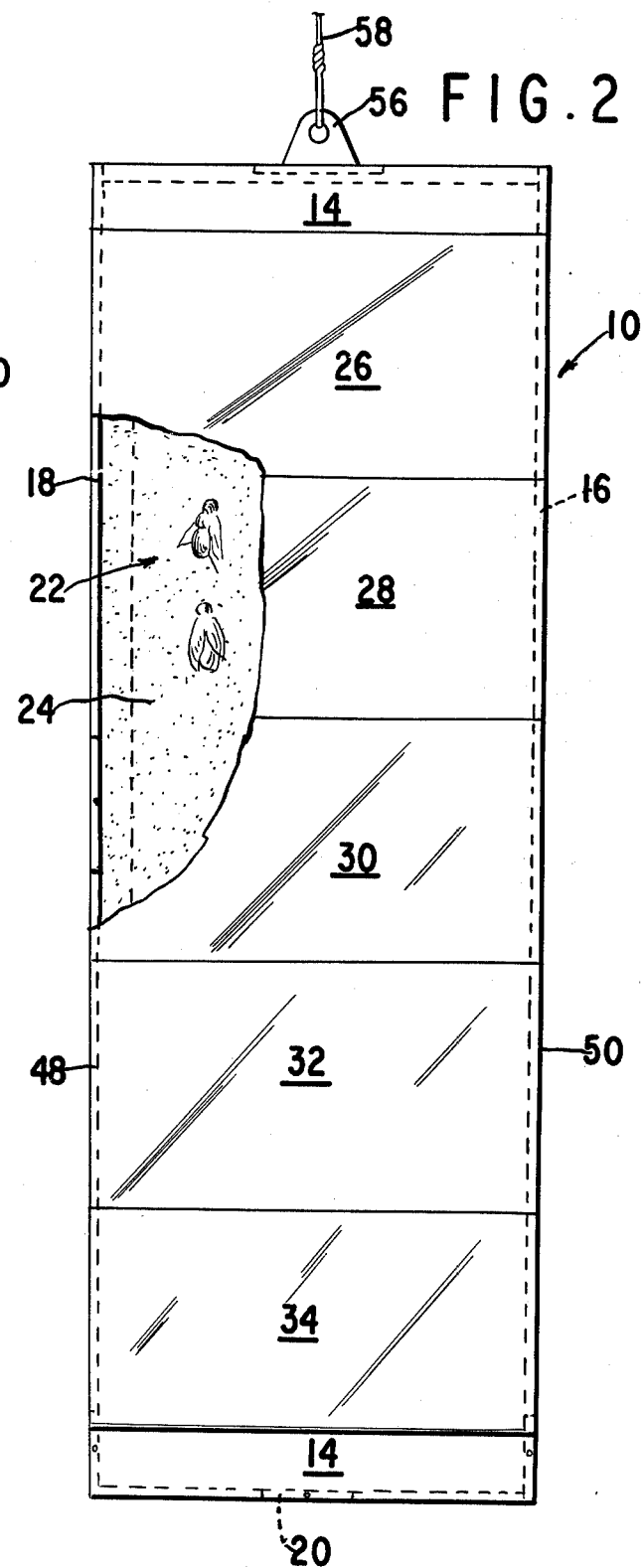

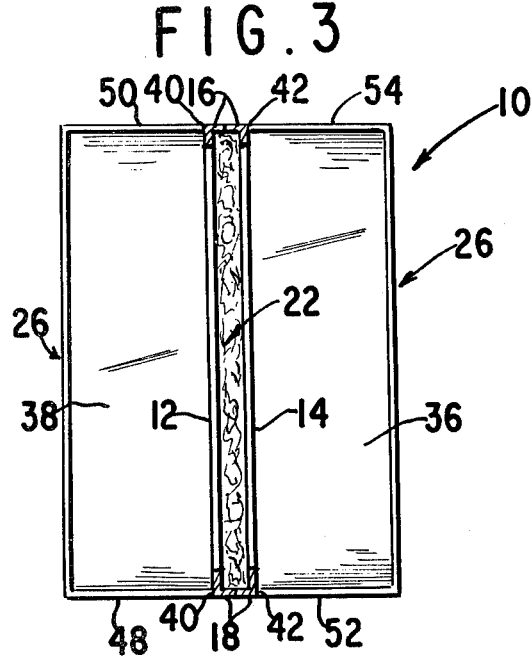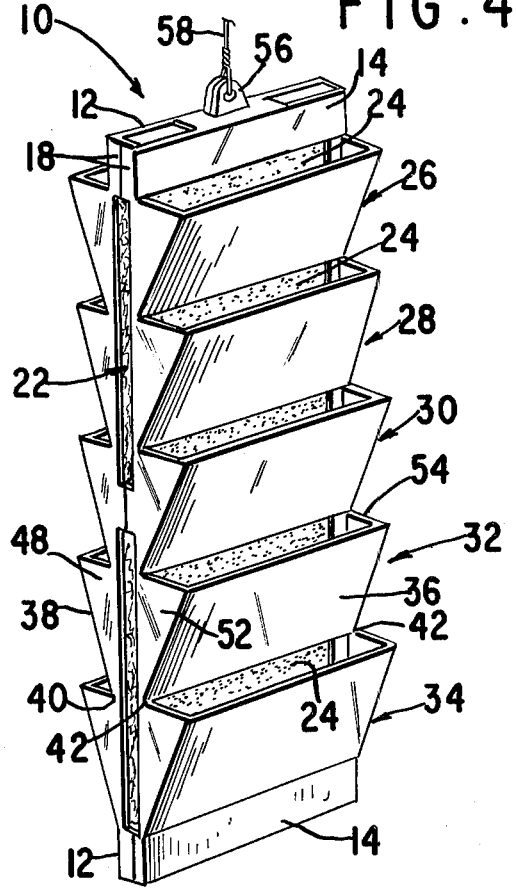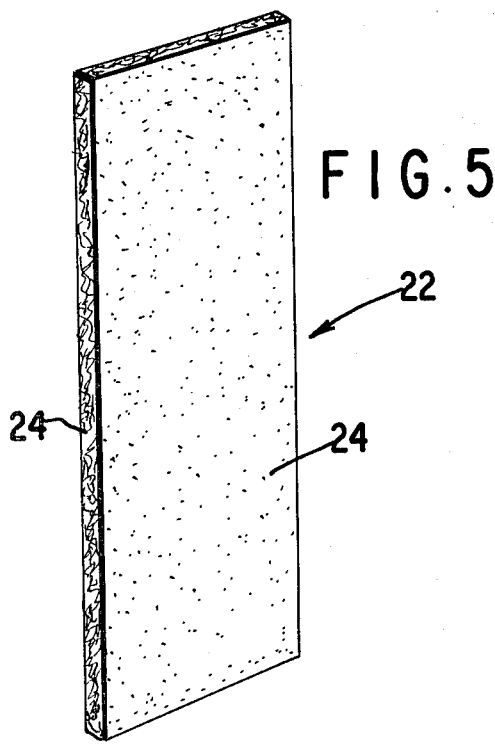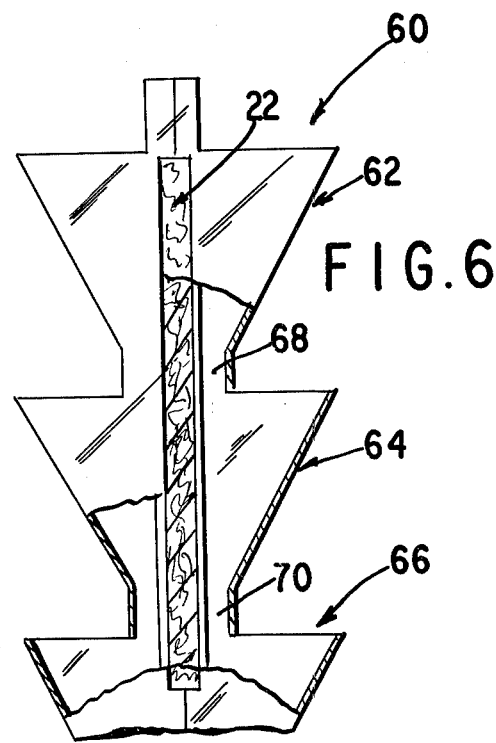

FLYING INSECT TRAP DEVICE FOR CONCEALING TRAPPED INSECTS

This invention relates to an insecticidal device. More particularly, the invention relates to an insecticidal device of the "flypaper" type which utilizes a non-drying glue to trap insects. The prior art flypaper, hanging vertically or placed horizontally, becomes unsightly when covered with flying insects. Also, with the prior art flypaper, insects become dislodged as they disintegrate over a period of time and fall to the floor beneath the flypaper.

It is an object of the present invention to provide a device which will trap flying insects and keep them out of sight.

It is a further object of the present invention to provide a device for trapping flying insects which provides a convenient storage receptacle for insects as they deteriorate over a period of time.

The present invention is an improvement on the insecticidal device shown in U.S. Pat. No. 3,826,036, issued July 30, 1974 to Guenther Neugebauer, the entire contents of which are incorporated herein by reference.

Other and further objects will be apparent to those skilled in the art from reading the following description in conjunction with the drawings in which:

FIG. 1 is a side view, partly in section, of the insecticidal device;

FIG. 2 is a front view, partly in section, of the insecticidal device of FIG. 1;

FIG. 3 is a sectional view taken generally along line 3—3 of FIG. 1;

FIG. 4 is a perspective view of the insecticidal device of FIG. 1;

FIG. 5 is a perspective view of the glue-coated inert substrate; and

FIG. 6 is a partial side view, partly in section, of an alternate embodiment of an insecticidal device.

The objects of the invention may be achieved with a vertical support structure for a non-drying glue coated on a suitable substrate, such as paper or plastic which is chemically inert with regard to said glue. A plurality of opaque hoppers are formed one above the other around the vertical support structure. The opening of each hopper is large at the top providing access of flying insects to the glue. Each hopper may be closed at the bottom to retain the insects which dry and disintegrate with the passage of time.

The concealing ability of the fins or sides of the hopper is a novel feature of the present invention. The hopper dimensions may be varied are long as insects are not inhibited from entering between the sides of the hopper. The hopper sides are spaced vertically to conceal the glued surface when the device is supported above eye level. A small device may utilize small and few hopper sides and a large device may utilize larger and additional hopper sides. Alternate embodiments do not require proportional increase or decrease in size from the preferred embodiment, which is about ten inches high by $3\frac{1}{2}$ inches wide by $2\frac{1}{2}$ inches deep. Preferably, the hopper sides are kept small enough so as not to become cumbersome.

In an especially advantageous embodiment, the bottoms of the upper hoppers are sufficiently open to permit the parts of deteriorating insects to fall into the bottom-most hopper which is closed at the bottom. If desired, the bottom-most hopper may be made larger than the upper hoppers to provide increased storage capacity.

The surface of the substrate is coated with non-drying glue. The glue will trap any flying insects that come into contact with the surface. The attached hopper sides covering the glue are designed to conceal from view the insects trapped on the open areas of the glue. When the concealing device is hung from ceilings or any area where flying insects congregate, trapped insects are not visible to individuals looking upward. The device of this invention has the distinct advantage in that if an insect is able to free itself from the glue, it will fall to the bottom of the trap. This prevents them from falling directly below which is possible with prior art commercial flypaper and insecticide pest strips now hung from ceilings. Dried insect bodies are a real concern and the main reason against using current flytraps in food establishments. As insects dry out, their body parts disconnect and fall to areas below the trap. The hopper device of the present invention solves the problem of the prior art devices.

The non-drying glue may be any that is suitable for such use. Suitable non-drying glues are commercially available, for instance Coated Products, Inc., Monmouth Junction, New Jersey, glue type PR256-B2A and, Zoecon Corporation, Palo Alto, California, adhesive type F.

As may be seen in the drawings, an insecticidal device 10 is made up of first and second planar members 12, 14 which are spaced apart from each other by side strips 16 and 18 and bottom strip 20. Together, these members support an inert substrate 22 which is coated with a non-drying, tacky glue or adhesive 24 and provide open areas for access to the glue by flying insects.

A plurality of hoppers 26, 28, 30, 32 and 34 are formed (as described for typical hopper 32) from inclined planar members 36, 38, which are joined at their bottom edges 40, 42 to the respective first and second planar members 12 and 14. At their upper ends, the inclined planar members 36, 38 are spaced a predetermined distance from the first and second planar members and supported there by substantially triangular, planar end portions 48, 50 and 52, 54, respectively. If desired, a clip 56 may be attached to the upper end portion of the device 10 for hanging support by a string or plastic tie 58.

The material of construction of the device is preferably stiff cardboard but may, if desired, be a plastic. Also, if desired, the insecticidal device may be made in similar fashion to that of U.S. Pat. No. 3,826,036 so that it may be molded in plastic as a flat article and then folded around the substrate to form the supporting device.

In FIG. 6, is shown an alternate embodiment of an insecticidal device 60 in which the upper hoppers 62, 64, 66 have enlarged lower discharge openings 68, 70 which permit dead insects which cease to adhere to the glue to fall from the upper hoppers into the lower hopper. The bottom hopper would be substantially the same as that shown for the preferred embodiment of FIG. 1.

One of the purposes of the hoppers is to conceal from view the insects adhering to the glue. This is accomplished in the preferred embodiment by having the tops of the hoppers even with the bottom of the hopper immediately above it. In the normal course of use, such insecticidal devices are elevated above the eye level of persons occupying the space being treated. Therefore, the insects are totally concealed in normal use.

What is claimed is:

1. A device for trapping flying insects and concealing the trapped insects comprising:
   A. First and second planar support members;
   B. Side and bottom spacer strips spacing apart said planar support members at a predetermined distance from each other;
   C. An inert substrate supported within said planar support members and said spacer strips;
   D. A non-drying tacky adhesive coated on said substrate;
   E. A plurality of hoppers supported by said planar members, each having
      1. First and second inclined planar members joined at their bottom edge portions to said first and second planar support members, respectively;
      2. Planar end members respectively connecting said first and second inclined planar members to said first and second planar support members whereby the upper end portions of said inclined planar members are spaced apart from said first and second support members.

2. A device as defined in claim 1 in which the upper hoppers have enlarged lower discharge openings whereby insect parts may fall into the bottom hopper.

3. A device as defined in claim 1 in which the tops of said inclined planar members of the intermediate hoppers are alined with the bottoms of the inclined planar members of the hopper next above.

4. A device as defined in claim 1 in which the material of construction is opaque.

5. A device as defined in claim 1 further comprising means to attach a hanging support device.

6. A device for trapping flying insects and concealing the trapped insects comprising:
   A. a chemically inert substrate;
      2. a non-drying glue coated on the outer surfaces of said substrate;
   B. means to support said substrate comprising:
      1. first and second planar members held in spaced apart relation by bottom and side strips and forming a receptacle to receive said substrate;
      2. a plurality of open areas defined in each of said first and second planar members;
   C. means to conceal said open areas comprising, in spaced relation with each open area,
      1. an inclined planar member connected at its bottom edge to one of said first and second planar members and being supported at its upper edge in spaced-apart relation to one of said first and second planar members;
      2. side members connected to said inclined planar member and the adjacent first or second planar member and, with said inclined planar member and said substrate, forming a hopper to contain dead insects.

* * * * *